United States Patent
Montanari et al.

(10) Patent No.: US 12,109,786 B2
(45) Date of Patent: Oct. 8, 2024

(54) MULTILAYER STRUCTURE BASED ON RECYCLED POLYAMIDE

(71) Applicant: ARKEMA FRANCE, Colombes (FR)

(72) Inventors: Thibaut Montanari, Serquigny (FR); Bertrand Verbauwhede, Serquigny (FR); Thierry Vasselin, Tokyo (JP); Pierre Nidercorn, Grindorff-Bizing (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/999,127

(22) PCT Filed: May 18, 2021

(86) PCT No.: PCT/FR2021/050856
§ 371 (c)(1),
(2) Date: Nov. 17, 2022

(87) PCT Pub. No.: WO2021/234263
PCT Pub. Date: Nov. 25, 2021

(65) Prior Publication Data
US 2023/0191756 A1 Jun. 22, 2023

(30) Foreign Application Priority Data
May 19, 2020 (FR) ........................................ 2005006

(51) Int. Cl.
| B32B 27/08 | (2006.01) |
| B32B 1/08 | (2006.01) |
| B32B 27/18 | (2006.01) |
| B32B 27/34 | (2006.01) |

(52) U.S. Cl.
CPC ................. *B32B 27/08* (2013.01); *B32B 1/08* (2013.01); *B32B 27/18* (2013.01); *B32B 27/34* (2013.01); *B32B 2250/03* (2013.01); *B32B 2250/24* (2013.01); *B32B 2272/00* (2013.01); *B32B 2307/704* (2013.01); *B32B 2307/7265* (2013.01); *B32B 2597/00* (2013.01); *B32B 2605/08* (2013.01)

(58) Field of Classification Search
CPC ........... B32B 27/08; B32B 1/08; B32B 27/18; B32B 27/34; B32B 2250/03; B32B 2250/24; B32B 2272/00; B32B 2307/704; B32B 2307/7265; B32B 2597/00; B32B 2605/08
See application file for complete search history.

(56) References Cited

U.S. PATENT DOCUMENTS

| 5,520,223 A | 5/1996 | Iorio et al. |
| 2004/0265527 A1 | 12/2004 | Schmitz et al. |

FOREIGN PATENT DOCUMENTS

| EP | 0428833 A2 | 5/1991 |
| EP | 1162061 A1 | 12/2001 |
| EP | 1216826 A2 | 6/2002 |
| EP | 1452307 A1 | 9/2004 |
| EP | 2098580 A1 | 9/2009 |
| EP | 3299165 A1 | 3/2018 |
| JP | 2003042351 A | 2/2003 |

OTHER PUBLICATIONS

English machine translation of JP2003042351. (Year: 2003).*
International Search Report (PCT/ISA/210) with English translation and Written Opinion (PCT/ISA/237) mailed on Sep. 13, 2021, by the European Patent Office as the International Searching Authority for International Application No. PCT/FR2021/050856.

* cited by examiner

*Primary Examiner* — Michael C Miggins
(74) *Attorney, Agent, or Firm* — Boone IP Law

(57) ABSTRACT

A multilayer tubular structure for transporting fluids for a motor vehicle, the structure including at least three layers: at least one layer having a composition predominantly including at least one semi-crystalline aliphatic polyamide, the composition having at least 50% of recycled material from a single-layer and/or multilayer tube that has been intended for transporting fluids for a motor vehicle, the tube having a composition which predominantly includes at least one polyamide, at least one layer having a composition predominantly including at least semi-crystalline aliphatic polyamide and optionally at least one impact modifier, and when the layer has a composition predominantly including at least one semi-crystalline aliphatic polyamide that is PA12 and/or PA612 and/or PA1010, then the composition includes the impact modifier, and at least one barrier layer, the layer and the barrier layer each having at least 90% of non-recycled material.

20 Claims, No Drawings

MULTILAYER STRUCTURE BASED ON RECYCLED POLYAMIDE

Every year, several million motor vehicles reach the end of their life across the globe. An end-of-life vehicle (ELV) contains numerous toxic and polluting products (liquids or solids): drain oil, battery, air conditioning fluid, explosive airbag components, etc. When processed under the wrong conditions, this waste can lead to soil and water pollution, as well as accidents. ELVs are therefore considered to be hazardous waste.

A large number of the vehicle's components can be recovered and recycled, in the form of spare parts or raw materials. Parts intended for re-use (headlights, indicators, motor, radiator, starter motor, bonnet, wings, doors, etc.) are removed and stored in order to be resold.

The carcass and parts that cannot be recycled (ferrous and non-ferrous metals, plastics, glass, rubber, etc.) are crushed in order to be recovered or placed in landfill.

European Directive 2000/53/EC relating to end-of-life vehicles sets a reuse and recovery target of 95% by weight per vehicle from 2015.

Only 5% of residual waste should remain, that is waste that is not able to be treated under the present technical and economic conditions and that will be incinerated or evacuated to specific storage centers.

The 95% reused and recovered are subject to:
Energy recovery: use of waste (oils, tires, plastics, etc.) as energy production means, by direct incineration with or without other waste,
Material recovery: Reuse or repurpose: new use of a part that retains the same use and is not converted, or Recycling: operation aimed at introducing materials from waste into the production cycle, by fully or partially replacing a virgin material.

A motor vehicle contains a large number of pipes particularly pipes for transporting fluids such as air, oil (for example to cool the automatic gearbox, "TOC" for Transmission Oil Cooler), water, a urea solution, a glycol-based coolant, a fuel such as gasoline, in particular bio-gasoline or diesel, in particular bio-diesel, or hydrogen.

These pipes can be single-layer and/or multi-layer tubular structures and or particularly based on polyamide(s).

When the motor vehicle has reached the end of life, the various pipes present therein are generally very or too degraded to be able to be reused as such, in the form of a tube, without risk or without this resulting in functional properties that are too degraded.

In fact, the tubes, notably under the engine bonnet, are fitted in a severe thermo-oxidative environment owing to the heat released by the engine that can typically reach 150° C. and the presence of air and therefore of oxygen. Each 10° C. increase in temperature typically results in the service life of the tubes being halved, as well as the degradation of certain additives of said tubes such as stabilizers.

Furthermore, a pipe for transporting a fuel, for example a polyamide pipe which contains a plasticizer, has lost the majority of its plasticizer when it reaches the end of life and the polyamide initially present therein is depolymerized and/or degraded and has lost most of its stabilizers, which prevents it from being reused safely.

Until now, the end-of-life automotive pipe is not reused and is often incinerated, but this then contributes to climate change, a reduction in which is becoming one of the major challenges of the $21^{st}$ century Moreover, several vehicle manufacturers have the medium to long term objective of recycling 100% of the vehicles that they manufacture so as to achieve zero environmental impact.

Consequently, the supply of recycled pipes to these manufacturers becomes essential and then makes it possible to reduce the quantity of pipes to be discarded or incinerated.

The present invention therefore relates to a multilayer tubular structure (MLT) for transporting fluids for a motor vehicle, in particular air, oil, water, urea solution, a glycol-based coolant, or a fuel such as gasoline, in particular alcohol-based gasoline, bio-gasoline or diesel, in particular bio-diesel, or hydrogen, comprising at least three layers:
  at least one layer (1) consisting of a composition predominantly comprising at least one semi-crystalline aliphatic polyamide, said composition consisting of at least 50% of recycled material from a single layer and/or multilayer tube that has been intended for transporting fluids for a motor vehicle, in particular as defined above, said tube consisting of a composition that predominantly comprises at least one polyamide,
  at least one layer (2) consisting of a composition predominantly comprising at least one semi-crystalline aliphatic polyamide and optionally at least one impact modifier,
  and when the layer (2) consists of a composition predominantly comprising at least one semi-crystalline aliphatic polyamide that is PA12 and/or PA612 and/or PA1010, then said composition comprises said impact modifier, and at least one barrier layer,
  said layer (2) and the barrier layer each consisting of at least 90% of non-recycled material.

The inventors have therefore surprisingly found that a polyamide-based layer consisting of at least 50% recycled material, in particular embedded between a polyamide-based layer and a barrier layer consisting of non-recycled material allowed the constitution of a multilayer tubular structure comprising at least three layers capable of transporting a vehicle fluid in particular air, oil, water, a urea solution, a glycol-based coolant, or a fuel such as gasoline, in particular bio-gasoline or diesel, in particular bio-diesel, or hydrogen, regardless of the type of fluid initially transported by the recycled single layer and/or multilayer tube constituting the embedded layer.

In other words, the present invention relates to a multilayer tubular structure (MLT) for transporting fluids for a motor vehicle, in particular air, oil, water, urea solution, a glycol-based coolant, or a fuel such as gasoline, in particular alcohol-based gasoline, bio-gasoline or diesel, in particular bio-diesel, or hydrogen, comprising at least three layers:
  at least one layer (1) consisting of a composition predominantly comprising at least one semi-crystalline aliphatic polyamide, said composition consisting of at least 50% of recycled material from a single layer and/or multilayer tube that initially transported fluids for a motor vehicle, in particular as defined above, said tube consisting of a composition that predominantly comprises at least one polyamide,
  at least one layer (2) consisting of a composition predominantly comprising at least one semi-crystalline aliphatic polyamide and optionally at least one impact modifier,
  and when the layer (2) consists of a composition predominantly comprising at least one semi-crystalline aliphatic polyamide that is PA12 and/or PA612 and/or PA1010, then said composition comprises said impact modifier, and at least one barrier layer, said layer (2) and the barrier layer each consisting of at least 90% of non-recycled material.

The single-layer and/or multi-layer tube that initially transported fluids for a motor vehicle from which the recycled material comes is therefore a used tube that has already transported said fluid for at least several months, in particular several years.

The single-layer and/or multi-layer tube that initially transported fluids therefore excludes a virgin tube.

The term "fluid" refers to a gas or a liquid used in the vehicle, in particular air, oil, water, a urea solution, a glycol-based coolant, or a fuel such as gasoline, in particular alcohol-based gasoline, bio-gasoline or diesel, in particular bio-diesel, or hydrogen.

Advantageously, said fluid refers to fuels, in particular gasoline, in particular alcohol-based gasoline, bio-gasoline or diesel, in particular bio-diesel.

The term "gasoline" refers to a hydrocarbon mixture from the distillation of petroleum to which additives or alcohols such as methanol and ethanol can be added, the alcohols being the predominant components in certain cases.

The expression "alcohol-based gasoline" refers to a gasoline in which methanol or ethanol have been added. It also refers to an E95-type gasoline that does not contain any petroleum distillation product.

The expression "based on polyamide" means at least 50% by weight of polyamide in the layer.

The expression "a composition predominantly comprising at least one polyamide . . . " means at least 50% by weight of said polyamide in the composition.

In one embodiment, said layer (2) consists of a composition predominantly comprising at least one semi-crystalline aliphatic polyamide and at least one impact modifier in a proportion from 3 to 45% by weight relative to the total weight of the composition.

The expression "barrier layer" refers to a layer having characteristics of low permeability and good resistance to the various constituents of the fluids for a motor vehicle, in particular air, oil, water, a urea solution, a glycol-based coolant, or a fuel such as gasoline, in particular alcohol-based gasoline, bio-gasoline or diesel, in particular bio-diesel, or hydrogen, that is, that the barrier layer slows down the movement of said fluid, and notably fuel, both for its polar components (such as ethanol) and for its apolar components (hydrocarbons) in the other layers of the structure or even on the exterior of the structure. The barrier layer is therefore a layer that first and foremost makes it possible to not lose too much gasoline to the atmosphere by diffusion, thus making it possible to avoid atmospheric pollution.

Regarding Layer (1)

The layer (1) consists of a composition predominantly comprising at least one semi-crystalline aliphatic polyamide, said composition consisting of at least 50% of recycled material from a single layer and/or multilayer tube that has been intended for transporting fluids for a motor vehicle.

The nomenclature used to define the polyamides is described in ISO standard 1874-1:2011 "Plastics—Polyamide (PA) Moulding And Extrusion Materials—Part 1: Designation" and is well known to a skilled person.

The term "polyamide" according to the invention refers equally to a homopolyamide or to a copolyamide.

The expression "semi-crystalline polyamide" in the sense of the invention throughout the description refers to polyamides that have a melting temperature (Tf) and an enthalpy of fusion $\Delta H > 25$ J/g, in particular $>40$ J/g, notably $>45$ J/g, as well as a glass-transition temperature (Tg) as determined by DSC according to ISO standards 11357-1:2016 and 11357-2 and 3:2013 at a heating rate of 20 K/min.

Said at least one semi-crystalline aliphatic polyamide is obtained from the polycondensation of at least one lactam, or from the polycondensation of at least one amino acid, or from the polycondensation of at least one diamine Xa with at least one dicarboxylic acid Yb.

When said at least one semi-crystalline aliphatic polyamide is obtained from the polycondensation of at least one lactam, said at least one lactam may be selected from a C6 to C18 lactam, preferentially C10 to C18, more preferentially C10 to C12. A C6 to C12 lactam is especially caprolactam, decanolactam, undecanolactam, and lauryllactam.

When said at least one semi-crystalline aliphatic polyamide is obtained from the polycondensation of at least one lactam, it may therefore comprise a single lactam or several lactams.

Advantageously, said at least one semi-crystalline aliphatic polyamide is obtained from the polycondensation of a single lactam and said lactam is selected from lauryllactam and undecanolactam, advantageously lauryllactam.

When said at least one semi-crystalline aliphatic polyamide is obtained from the polycondensation of at least one amino acid, said at least one amino acid can be selected from a C6 to C18 amino acid, preferentially C10 to C18, more preferentially C10 to C12 amino acid.

A C6 to C12 amino acid is especially 6-aminohexanoic acid, 9-aminononanoic acid, 10-aminodecanoic acid, 10-aminoundecanoic acid, 12-aminododecanoic acid and 11-aminoundecanoic acid and derivatives thereof, in particular N-heptyl-11-aminoundecanoic acid.

When said at least one semi-crystalline aliphatic polyamide is obtained from the polycondensation of at least one lactam, it may therefore comprise a single amino acid or several amino acids.

Advantageously, said semi-crystalline aliphatic polyamide is obtained from the polycondensation of a single amino acid and said amino acid is selected from 11-aminoundecanoic acid and 12-aminododecanoic acid, advantageously 11-aminoundecanoic acid.

When said at least one semi-crystalline aliphatic polyamide is obtained from the polycondensation of at least one C4-C36 diamine Xa, preferentially C5-C18, preferentially C5-C12, more preferentially C10-C12, with at least one C4-C36 diacid Yb, preferentially C6-C18, preferentially C6-C12, more preferentially C10-C12, then said at least one diamine Xa is an aliphatic diamine and said at least one diacid Yb is an aliphatic diacid.

The diamine may be linear or branched. Advantageously, it is linear.

Said at least one C4-C36 diamine Xa can be in particular selected from 1,4-butanediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine, octadecenediamine, eicosanediamine, docosanediamine and the diamines obtained from fatty acids.

Advantageously, said at least one diamine Xa is C5-C18 and selected from 1,5-pentamethylenediamine, 1,6-hexamethylenediamine, 1,7-heptamethylenediamine, 1,8-octamethylenediamine, 1,9-nonamethylenediamine, 1,10-decamethylenediamine 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine.

Advantageously, said at least one C5 to C12 diamine Xa is in particular selected from 1,5-pentamethylenediamine, 1,6-hexamethylenediamine, 1,7-heptamethylenediamine, 1,8-octamethylediamine, 1,9-nonamethylenediamine, 1,10-decamethylenediamine, 1,11-undecamethylenediamine, and 1,12-dodecamethylenediamine.

Advantageously, said at least one C6 to C12 diamine Xa is in particular selected from 1,6-hexamethylenediamine, 1,7-heptamethylenediamine, 1,8-octamethylenediamine, 1,9-nonamethylenediamine, 1,10-decamethylenediamine, 1,11-undecamethylenediamine, and 1,12-dodecamethylenediamine.

Advantageously, the diamine Xa used is a C10 to C12 diamine, in particular selected from 1,10-decamethylenediamine, 1,11-undecamethylenediamine, and 1,12-dodecamethylenediamine.

Said at least one C4 to C36 dicarboxylic acid Yb may be selected from succinic acid, glutaric acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and diacids obtained from fatty acids.

The diacid may be linear or branched. Advantageously, it is linear.

Advantageously, said at least one dicarboxylic acid Yb is C6 to C18 and is selected from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, said at least one dicarboxylic acid Yb is C6 to C12 and is selected from adipic acid, suberic acid, azelaic acid, sebacic acid, undecanedioic acid, and dodecanedioic acid.

Advantageously, said at least one dicarboxylic acid Yb is C10 to C12 and is selected from sebacic acid, undecanedioic acid and dodecanedioic acid.

When said semi-crystalline aliphatic polyamide is obtained from the polycondensation of at least one diamine Xa with at least one dicarboxylic acid Yb, it may therefore comprise a single diamine or a plurality of diamines and a single dicarboxylic acid or a plurality of dicarboxylic acids.

Advantageously, said semi-crystalline aliphatic polyamide is obtained from the polycondensation of a single diamine Xa with a single dicarboxylic acid Yb.

The expression "predominantly comprising at least one aliphatic type polyamide" means that said composition of the layer (1) comprises at least 50% by weight of at least one aliphatic polyamide relative to the total weight of said composition.

Advantageously, said composition of the layer (1) comprises at least 60% by weight, especially at least 70% by weight, in particular at least 80% by weight, more particularly at least 90% by weight of at least one aliphatic polyamide relative to the total weight of said composition.

Said composition of the layer (1) consists of at least 50% recycled material from a single-layer and/or multilayer tube that has been intended for transporting fluids for a motor vehicle.

This means either that the "at least one predominant polyamide" of said composition corresponds in its entirety to what is called "at least 50% recycled material" or that at least 50% by weight of all of the constituents of the composition are originally recycled from a single layer tube, or multilayer tube, or a mixture of a single layer and multilayer tube.

The recycled material can come from a single layer and/or multilayer tube, said single layer and/or multilayer tubes having been intended for transporting fluids for a motor vehicle. Said tube is therefore a used tube, i.e. it has been used for at least one year for transporting said fluid defined above. Said single layer tube consists of a composition comprising a semi-crystalline aliphatic polyamide and optionally impact modifiers and/or additives and/or plasticizers and/or antistatic fillers.

Said multilayer tube comprises at least one layer consisting of a composition comprising a semi-crystalline aliphatic polyamide and optionally impact modifiers and/or additives. It may therefore comprise other layers consisting of a different thermoplastic polymer to a semi-crystalline aliphatic polyamide, such as for example a polypropylene, a semi-aromatic polyamide or an ethylene vinyl alcohol polymer (EVOH).

It is very obvious that the single layer tube can also be a single layer tube mixture, i.e. for example two types of single layer tubes each consisting of a different semi-crystalline aliphatic polyamide, for example a PA11 and a PA12.

It is also very obvious that the multilayer tube can also be a mixture of different types of multilayer tube, provided that at least one of the layers of one of the types of multilayer tube consists of a semi-crystalline aliphatic polyamide.

If the mixed tubes are incompatible with each other, then the addition of a second semi-crystalline aliphatic polyamide denoted B and having an average number of carbon atoms per nitrogen atom denoted $C_B=Cc-1$, preferentially $C_B=Cc-2$ and preferably of a third polyamide enables them to be compatible.

Said single layer and/or multilayer tube intended for transporting fluids for a motor vehicle and that is therefore used can undergo several different treatments in order to be able to be recycled:

It can be quite simply crushed;

It can be crushed and recompounded, i.e. after crushing, the crushed particles are fed into an extruder, notably a co-rotating twin screw type, or co-kneader type (Buss) extruder, where they are mixed together again by melting. The molten material comes out of the extruder in strands that are cooled and cut into granules;

It can be crushed and recompounded and reformulated, i.e. after crushing, the crushed particles are fed into an extruder, as defined above where they are remixed by melting with the addition of at least one compound selected from a semi-crystalline aliphatic polyamide, that may or may not be of recycled origin, at least one impact modifier, a plasticizer, an additive and antistatic fillers. The molten material comes out of the extruder in strands that are cooled and cut into granules.

Optionally, the single layer and/or multilayer tube for transporting fluid for a motor vehicle undergoes a washing and/or cleaning step before crushing.

Optionally, the crushed tube undergoes a washing and/or cleaning step after crushing.

Optionally, the single layer and/or multilayer tube for transporting fluid for a motor vehicle undergoes a washing and/or cleaning step before crushing then is crushed and it then optionally undergoes, before recompounding, a washing and/or cleaning step after crushing.

The cleaning step can be performed, for example, under vacuum.

In one embodiment, said composition of the layer (1) comprises:

at least 50% by weight, in particular from 50% to 99% by weight, notably from 50% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 50% by weight of at least one semi-crystalline aliphatic polyamide denoted B and having an average number of carbon atoms per nitrogen atom denoted $C_B=C_c-1$, preferentially $C_B=C_c-2$;

from 0 to 50% by weight of a semi-crystalline aliphatic polyamide denoted A having an average number of carbon atoms per nitrogen atom denoted $C_A=C_B-1$, preferentially $C_A=C_B-2$;

from 0 to 45% by weight of at least one impact modifier, in particular from 1 to 45% by weight of at least one impact modifier, notably from 2 to 45% by weight of at least one impact modifier, from 0 to 20% by weight of at least one plasticizer, from 0 to 2% by weight of at least one additive, the sum of the constituents being equal to 100%.

In another embodiment, said composition of the layer (1) consists of:

at least 50% by weight, in particular from 50% to 99% by weight, notably from 50% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 25% by weight of at least one semi-crystalline aliphatic polyamide denoted B and having an average number of carbon atoms per nitrogen atom denoted $C_B=C_c-1$, preferentially $C_B=C_c-2$;

from 0 to 25% by weight of a semi-crystalline aliphatic polyamide denoted A having an average number of carbon atoms per nitrogen atom denoted $C_A=C_B-1$, preferentially $C_A=C_B-2$;

from 0 to 45% by weight of at least one impact modifier, in particular from 1 to 45% by weight of at least one impact modifier, notably from 2 to 45% by weight of at least one impact modifier, from 0 to 20% of at least one plasticizer, from 0 to 2% by weight of at least one additive, the sum of the constituents being equal to 100%.

The polyamides denoted A, B and C can be of recycled or non-recycled origin provided that the composition of the layer (1) consists of at least 50% recycled material.

Advantageously, the Tf of the predominant semi-crystalline aliphatic polyamide of the layer (1) is ≤225° C., particularly ≤200° C., as determined according to ISO 11357-3: 2013, at a heating rate of 20 K/min.

In one embodiment, said composition of the layer (1) is free of plasticizer and/or impact modifier and said recycled material originates from a tube selected from a crushed tube, a crushed and recompounded tube and a crushed, recompounded and reformulated tube.

In another embodiment, said composition of the layer (1) comprises at least one compound selected from a plasticizer, an impact modifier and an additive, and said recycled material is selected from a crushed, then recompounded and reformulated tube.

Advantageously, in these latter two embodiments, said tube is a single layer tube and/or a multilayer tube.

In one embodiment, the fluid transported by said single layer and/or multilayer tube is different to that of said multilayer tubular structure (MLT).

This means that if the single layer and/or multilayer tube transported a fluid such as air, said multilayer tubular structure (MLT) may be intended to transport gasoline or else, that if the single layer and/or multilayer tube transported a fluid such as alcohol-based gasoline, said tubular structure (MLT) may be intended to transport diesel.

In another embodiment, the fluid transported by said single layer and/or multilayer tube is the same as that of said multilayer tubular structure (MLT).

This means that if the single layer and/or multilayer tube transported a fluid such as gasoline, said tubular structure (MLT) may be intended to transport gasoline provided that the gasoline of the single layer and/or multilayer tube and of said multilayer tubular structure (MLT) is the same, for example, alcohol-based gasoline.

Advantageously, the recycled material comes from a single layer tube consisting of a composition comprising only a PA11.

In one embodiment, said composition of the layer (1) comprises at least 60% by weight, especially at least 70% by weight, especially at least 80% by weight, in particular at least 90% by weight, more particularly at least 95% of recycled material.

In another embodiment, said composition of the layer (1) consists of 100% by weight of recycled material.

Recycled Used Single Layer or Multilayer Tube

In a first variant, said tube that has been intended for transporting fluid for a motor vehicle is single layer or multilayer and simply crushed and the composition of the layer (1) resulting from said recycling consists of:

at least 61% by weight, in particular from 96% to 99% by weight, notably from 96% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 2% of at least one plasticizer, from 0 to 2% by weight of at least one additive, particularly a stabilizer;

the sum of the constituents being equal to 100%.

Advantageously, in this first variant, the semi-crystalline aliphatic polyamide denoted C is selected from PA612, PA1012, PA1010, PA11 and PA12, in particular PA11.

Advantageously in this first variant, said tube has been intended for transporting fuel such as gasoline, in particular alcohol-based gasoline, bio-gasoline or diesel, in particular bio-diesel.

Advantageously in this first variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a second variant, said tube that has been intended for transporting fluid for a motor vehicle is single layer or multilayer, crushed and recompounded, and the composition of the layer (1) resulting from said recycling consists of:

at least 61% by weight, in particular from 96% to 99% by weight, notably from 96% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 2% of at least one plasticizer, from 0 to 2% by weight of at least one additive, particularly a stabilizer;

the sum of the constituents being equal to 100%.

Advantageously, in this second variant, the semi-crystalline aliphatic polyamide denoted C is selected from PA612, PA1012, PA1010, PA11 and PA12, in particular PA11.

Advantageously in this second variant, said tube has been intended for transporting fuel such as gasoline, in particular alcohol-based gasoline, bio-gasoline or diesel, in particular bio-diesel.

Advantageously in this second variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a third variant, said tube that has been intended for transporting fluid for a motor vehicle is single layer or multilayer, crushed, recompounded and reformulated and the composition of the layer (1) resulting from said recycling and reformulated consists of:

at least 58.5% by weight of at least one semi-crystalline aliphatic polyamide denoted C having an average number of carbon atoms per nitrogen atom denoted $C_c$ comprised from 6 to 18, advantageously from 8 to 12;

from 6 to 14% of at least one plasticizer, in particular from 6 to 8%;

from 0.5 to 1.5% by weight of at least one additive, in particular a stabilizer;

the sum of the constituents being equal to 100%.

Advantageously, in this third variant, the semi-crystalline aliphatic polyamide denoted C is selected from PA612, PA1012, PA1010, PA11 and PA12, in particular PA11.

Advantageously in this third variant, said tube has been intended for transporting fuel such as gasoline, in particular alcohol-based gasoline, bio-gasoline or diesel, in particular bio-diesel.

Advantageously in this third variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a fourth variant, said tube that has been intended for transporting fluid for a motor vehicle is single layer or multilayer, crushed, recompounded and reformulated and the composition of the layer (1) resulting from said recycling and reformulated consists of:

at least 58% by weight of at least one semi-crystalline aliphatic polyamide denoted C having an average number of carbon atoms per nitrogen atom denoted $C_c$ comprised from 6 to 18, advantageously from 8 to 12;

from 6 to 14% of at least one plasticizer, in particular from 6 to 8%;

from 1 to 2% by weight of at least one additive, in particular a stabilizer and a catalyst;

the sum of the constituents being equal to 100%.

Advantageously, in this fourth variant, the semi-crystalline aliphatic polyamide denoted C is selected from PA612, PA1012, PA1010, PA11 and PA12, in particular PA11.

Advantageously in this fourth variant, said tube has been intended for transporting fuel such as gasoline, in particular alcohol-based gasoline, bio-gasoline or diesel, in particular bio-diesel.

Advantageously in this fourth variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

Advantageously, the composition is degassed during compounding, even more advantageously, the degassing is located just after the melting zone, and before the zone for introducing plasticizer such as BBSA or the like.

In a fifth variant, said tube that has been intended for transporting fluid for a motor vehicle is single layer or multilayer, crushed, recompounded and reformulated and the composition of the layer (1) resulting from said recycling and reformulated consists of:

at least 50% by weight, in particular from 50% to 99% by weight, notably from 50% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 25% by weight of at least one semi-crystalline aliphatic polyamide denoted B and having an average number of carbon atoms per nitrogen atom denoted $C_B=C_c-1$, preferentially $C_B=C_c-2$;

from 0 to 25% by weight of a semi-crystalline aliphatic polyamide denoted A having an average number of carbon atoms per nitrogen atom denoted $C_A=C_B-1$, preferentially $C_A=C_B-2$;

from 0 to 2% of at least one plasticizer, from 0 to 2% by weight of at least one additive, the sum of the constituents being equal to 100%.

Advantageously, in this fifth variant, the semi-crystalline aliphatic polyamide denoted C is selected from PA612, PA1012, PA1010, PA11 and PA12, in particular PA11.

Advantageously in this fifth variant, said tube has been intended for transporting fuel such as gasoline, in particular alcohol-based gasoline, bio-gasoline or diesel, in particular bio-diesel.

Advantageously in this fifth variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a sixth variant, said tube that has been intended for transporting fluid for a motor vehicle is single layer or multilayer, crushed, recompounded and reformulated and the composition of the layer (1) resulting from said recycling and reformulated consists of:

at least 55% by weight, particularly from 55% to 99% by weight, notably from 55% to 98% by weight, of at least one semi-crystalline aliphatic polyamide denoted C having an average number of carbon atoms per nitrogen atom denoted $C_c$ comprised from 6 to 18, advantageously from 8 to 12;

from 0 to 45% by weight of at least one impact modifier, in particular from 1 to 45% by weight of at least one impact modifier, notably from 2 to 45% by weight of at least one impact modifier, the sum of the constituents being equal to 100%.

Advantageously, in this sixth variant, the semi-crystalline aliphatic polyamide denoted C is selected from PA612, PA1012, PA1010, PA11 and PA12, in particular PA11.

Advantageously in this fifth variant, said tube has been intended for transporting fuel such as gasoline, in particular alcohol-based gasoline, bio-gasoline or diesel, in particular bio-diesel.

Advantageously in this sixth variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a seventh variant, said tube that has been intended for transporting fluid for a motor vehicle is single layer or multilayer, crushed, recompounded and reformulated and the composition of the layer (1) resulting from said recycling and reformulated consists of:
- at least 50% by weight of at least one semi-crystalline aliphatic polyamide denoted C having an average number of carbon atoms per nitrogen atom denoted $C_c$ comprised from 6 to 18, advantageously from 8 to 12;
- from 0 to 43.5% by weight of at least one impact modifier, particularly from 1 to 43.5% by weight of at least one impact modifier, notably from 2 to 43.5% by weight of at least one impact modifier,
- from 6 to 14% of at least one plasticizer, in particular from 6 to 8%;
- from 0.5 to 1.5% by weight of at least one additive, in particular a stabilizer;
- the sum of the constituents being equal to 100%.

Advantageously, in this seventh variant, the semi-crystalline aliphatic polyamide denoted C is selected from PA612, PA1012, PA1010, PA11 and PA12, in particular PA11.

Advantageously in this fifth variant, said tube has been intended for transporting fuel such as gasoline, in particular alcohol-based gasoline, bio-gasoline or diesel, in particular bio-diesel.

Advantageously in this seventh variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In an eighth variant, said tube that has been intended for transporting fluid for a motor vehicle is single layer or multilayer, crushed, recompounded and reformulated and the composition of the layer (1) resulting from said recycling and reformulated consists of:
- at least 50% by weight of at least one semi-crystalline aliphatic polyamide denoted C having an average number of carbon atoms per nitrogen atom denoted $C_c$ comprised from 6 to 18, advantageously from 8 to 12;
- from 0 to 43% by weight of at least one impact modifier, particularly from 1 to 43% by weight of at least one impact modifier, notably from 2 to 38% by weight of at least one impact modifier,
- from 6 to 14% of at least one plasticizer, in particular from 6 to 8%;
- from 1 to 2% by weight of at least one additive, in particular a stabilizer and a catalyst;
- the sum of the constituents being equal to 100%.

Advantageously, in this eighth variant, the semi-crystalline aliphatic polyamide denoted C is selected from PA612, PA1012, PA1010, PA11 and PA12, in particular PA11.

Advantageously in this fifth variant, said tube has been intended for transporting fuel such as gasoline, in particular alcohol-based gasoline, bio-gasoline or diesel, in particular bio-diesel.

Advantageously in this eighth variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

In a ninth variant, said tube that has been intended for transporting fluid for a motor vehicle is single layer or multilayer, crushed, recompounded and reformulated and the composition of the layer (1) resulting from said recycling and reformulated consists of:
- at least 50% by weight of at least one semi-crystalline aliphatic polyamide denoted C having an average number of carbon atoms per nitrogen atom denoted $C_c$ comprised from 6 to 18, advantageously from 8 to 12;
- from 0 to 25% by weight of at least one semi-crystalline aliphatic polyamide denoted B and having an average number of carbon atoms per nitrogen atom denoted $C_B=C_c-1$, preferentially $C_B=C_c-2$;
- from 0 to 25% by weight of a semi-crystalline aliphatic polyamide denoted A having an average number of carbon atoms per nitrogen atom denoted $C_A=C_B-1$, preferentially $C_A=C_B-2$;
- from 0 to 43% by weight of at least one impact modifier, particularly from 1 to 43% by weight of at least one impact modifier, notably from 2 to 38% by weight of at least one impact modifier,
- from 0 to 20% of at least one plasticizer,
- from 0 to 2% by weight of at least one additive,
- the sum of the constituents being equal to 100%.

Advantageously, in this ninth variant, the semi-crystalline aliphatic polyamide denoted C is selected from PA612, PA1012, PA1010, PA11 and PA12, in particular PA11.

Advantageously in this fifth variant, said tube has been intended for transporting fuel such as gasoline, in particular alcohol-based gasoline, bio-gasoline or diesel, in particular bio-diesel.

Advantageously in this ninth variant, the semi-crystalline aliphatic polyamide denoted C is selected from PA612, PA1012, PA1010, PA11 and PA12, in particular PA11, and said tube has been intended for transporting fuel such as gasoline, in particular alcohol-based gasoline, bio-gasoline or diesel, in particular bio-diesel.

Advantageously, said tube that has been intended for transporting fluid for a motor vehicle is single layer.

Regarding the Impact Modifier

The impact modifier advantageously consists of a polymer with a flexural modulus below 100 MPa measured according to standard ISO 178: 2010, determined at 23° C. with relative humidity: RH50%, and Tg below 0° C. (measured according to standard 11357-2:2013 at the inflection point of the DSC thermogram, at a heating rate of 20 K/min), particularly a polyolefin.

The polyolefin of the impact modifier may be functionalized or non-functionalized or be a mixture of at least one functionalized polyolefin and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. By way of example, mention may be made of:

the homopolymers and copolymers of polyethylene, particularly LDPE, HDPE, LLDPE (linear low-density polyethylene), VLDPE (very low density polyethylene) and metallocene polyethylene.

homopolymers or copolymers of propylene.

ethylene/alpha-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. Byway of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, especially maleic anhydride, according to a graft rate for example of 0.01 to 5% by weight.

The functionalized polyolefin (B1) may be chosen from the following, maleic anhydride or glycidyl methacrylate grafted, (co)polymers wherein the graft rate is for example from 0.01 to 5% by weight:

of PE, of PP, of copolymers of ethylene with propylene, butene, hexene, or octene containing for example from 35 to 80% by weight of ethylene;

ethylene/alpha-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

ethylene and vinyl acetate copolymers (EVA), containing up to 40% by weight of vinyl acetate;

ethylene and alkyl (meth)acrylate copolymers, containing up to 40% by weight of alkyl (meth)acrylate;

ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene then condensed with a mono-amine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and may be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PPs, high-density PEs, medium-density PEs, linear low-density PEs, low-density PEs, very low-density PEs. These polyethylenes are known by the person skilled in the art as being produced according to a "free-radical" method, according to a "Ziegler" catalysis method, or, more recently, a so-called "metallocene" catalysis.

Advantageously, the functionalized polyolefins (B1) are selected from any polymer comprising alpha-olefin units and units bearing polar reactive functions such as epoxy, carboxylic acid or carboxylic acid anhydride functions. By way of examples of such polymers, mention may be made of terpolymers of ethylene, of alkyl acrylate and of maleic anhydride or of glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Regarding the Additives

The additives optionally used in the compositions of the invention are the conventional additives used in polyamides well known to a person skilled in the art and are described notably in EP 2098580.

For example, they are selected from a catalyst, an antioxidant, a heat stabilizer, a UV absorber, a light stabilizer, a lubricant, an inorganic filler, a flame-retardant agent, a nucleating agent and a dye, reinforcement fibers, a wax and mixtures thereof.

The term "catalyst" denotes a polycondensation catalyst such as a mineral or organic acid.

Advantageously, the proportion by weight of catalyst is comprised from around 50 ppm to about 5000 ppm, particularly from about 100 to about 3000 ppm relative to the total weight of the composition.

Advantageously, the catalyst is chosen from phosphoric acid (H3PO4), phosphorous acid (H3PO3), hypophosphorous acid (H3PO2), or a mixture thereof.

As an example, the stabilizer can be a UV stabilizer, an organic stabilizer or more generally a combination of organic stabilizers, such as a phenol antioxidant (for example of the type Irganox® 245 or 1098 or 1010 by Ciba-BASF), a phosphite antioxidant (for example Irgafos® 126 and Irgafos® 168 by Ciba-BASF) and optionally other stabilizers such as a HALS, which means Hindered Amine Light Stabilizer (for example Tinuvin® 770 by Ciba-BASF), an anti-UV (for example Tinuvin® 312 by Ciba), or a phosphorus-based stabilizer. Amine antioxidants such as Crompton's Naugard® 445 or polyfunctional stabilizers such as Clariant's Nylostab® S-EED can also be used.

This stabilizer may also be a mineral stabilizer, such as a copper-based stabilizer. Byway of example of such mineral stabilizers, mention may be made of halides and copper acetates. Secondarily, other metals such as silver may optionally be considered, but these are known to be less effective. These copper-based compounds are typically associated with alkali metal halides, particularly potassium.

Regarding the Plasticizer:

The plasticizers are, as an example, the plasticizers are selected from benzene sulfonamide derivatives, such as n-butylbenzenesulfonamide (BBSA); ethyl toluenesulfonamide or N-cyclohexyl toluenesulfonamide; hydroxybenzoic acid esters, such as 2-ethylhexyl parahydroxybenzoate and 2-decylhexyl parahydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

Using a mixture of plasticizers would not be outside the scope of the invention.

The additives, when they are present in the composition, are advantageously present from 1 to 20% by weight, notably from 5 to 15% by weight, in particular from 5 to 12% by weight.

Regarding Antistatic Fillers

The antistatic fillers are, for example, selected from carbon black, graphite, carbon fibers, carbon nanotubes, in particular carbon black and carbon nanotubes, Regarding Layer (2)

The terms "semi-crystalline polyamide" and "aliphatic" have the same definition as for layer (1).

Said at least one semi-crystalline aliphatic polyamide is obtained in the same way as described above for the layer (1).

In a first variant of the layer (2), said layer (2) is free of impact modifier.

In this case, the semi-crystalline aliphatic polyamide that is PA12 or PA612 or PA1010 is excluded from the composition that constitutes the layer (2).

In a second variant of layer (2), said layer (2) comprises from 3 to 45% by weight of at least one impact modifier, in particular from 5 to 20% by weight of at least one impact modifier.

In one embodiment of this second variant, said layer (2) consists of a composition comprising:
  at least 50% by weight, notably from 50% to 97% by weight, in particular from 50% to 95% by weight, of at least one semi-crystalline aliphatic polyamide denoted D having an average number of carbon atoms per nitrogen atom denoted CD comprised from 6 to 18, advantageously from 9 to 15;
  from 0 to 25% by weight of at least one semi-crystalline aliphatic polyamide denoted E and having an average number of carbon atoms per nitrogen atom denoted $C_E$=CD−1, preferentially $C_E$=CD−2;
  from 0 to 25% by weight of a semi-crystalline aliphatic polyamide denoted F having an average number of carbon atoms per nitrogen atom denoted $C_F$=$C_E$−1, preferentially $C_F$=$C_E$−2;
  from 3 to 45% by weight of at least one impact modifier, in particular from 5 to 20% by weight of at least one impact modifier;
  from 0 to 20% of at least one plasticizer;
  from 0 to 2% by weight of at least one additive,
  from 0 to 35% of at least one antistatic filler,
  the sum of the constituents being equal to 100%.

In another embodiment of this second variant, said layer (2) consists of a composition comprising:
  at least 50% by weight, notably from 50% to 97% by weight, by weight, in particular from 50% to 95% by weight, of at least one semi-crystalline aliphatic polyamide denoted D having an average number of carbon atoms per nitrogen atom denoted CD comprised from 6 to 18, advantageously from 9 to 15;
  from 0 to 25% by weight of at least one semi-crystalline aliphatic polyamide denoted E and having an average number of carbon atoms per nitrogen atom denoted $C_E$=CD−1, preferentially $C_E$=CD−2;
  from 0 to 25% by weight of a semi-crystalline aliphatic polyamide denoted F having an average number of carbon atoms per nitrogen atom denoted $C_F$=$C_E$−1, preferentially $C_F$=$C_E$−2;
  from 3 to 45% by weight of at least one impact modifier, in particular from 5 to 20% by weight of at least one impact modifier;
  from 0 to 20% of at least one plasticizer;
  from 0 to 2% by weight of at least one additive,
  from 0 to 35% of at least one antistatic filler,
  the sum of the constituents being equal to 100%.

Advantageously, the composition of said layer (2) comprises a PA11, a PA12 or a PA612 and from 3 to 45% by weight of an impact modifier, in particular from 5 to 20% by weight of an impact modifier.

Regarding the Barrier Layer

As already mentioned, the barrier layer slows down the movement of said fluid, and notably fuel, both for its polar components (such as ethanol) and for its apolar components (hydrocarbons) in the other layers of the structure or even on the exterior of the structure. It is therefore based on barrier materials that can be polyphthalamides (PPA) and/or also non-polyamide barrier materials such as highly crystalline polymers such as the copolymer of ethylene and vinyl alcohol (hereinafter denoted EVOH), or even functionalized fluorinated materials such as functionalized polyvinylidene fluoride (PVDF), the functionalized copolymer of ethylene and tetrafluoroethylene (ETFE), the functionalized copolymer of ethylene, tetrafluoroethylene and hexafluoropropylene (EFEP), functionalized polyphenylene sulfide (PPS), functionalized polybutylene naphthalate (PBN). If these polymers are not functionalized, then an intermediate binder layer can be added in order to provide good adhesion within the MLT structure.

Of said barrier materials, EVOH are particularly interesting, notably richest in vinyl alcohol comonomers as well as those impact-modified as they make it possible to produce less fragile structures, together with polyphthalamides, notably coPA6T, PA9T and its copolymers, PA10T and its copolymers or PPA based on meta-xylylenediamine (MXD) such as MXD6 or MXD10 that can also be impact-modified.

The barrier layer therefore consists of a composition based on at least one of the barrier materials above, that is, a composition comprising at least 50% of said barrier material.

Said composition can therefore also comprise impact modifiers as defined above.

Regarding the Structure

All the embodiments of the layer (1) described above in the paragraph "Regarding layer (1)" can be used for the structure detailed in this section.

In one embodiment, said layer (1) is located between a layer (2) and the barrier layer.

Advantageously, said barrier layer is the layer in contact with the transported fluid.

Advantageously, the composition of said layer (2) comprises a PA11, a PA12 or a PA612 and the recycled material comes from a single layer tube consisting of a composition comprising only one PA11, in particular the composition of the layer (1) consists of 100% recycled material.

Advantageously, the composition of said layer (2) comprises a PA11, a PA12 or a PA612, the recycled material comes from a single layer tube consisting of a composition comprising only one PA11, in particular the composition of the layer (1) consists of 100% recycled material and the composition of said layer (2') comprises a PA11, a PA12 or a PA612.

Advantageously, the composition of said layer (2) comprises a PA11, a PA12 or a PA612 and from 3 to 45% by weight of at least one impact modifier, in particular from 5 to 20% by weight of at least one impact modifier and the recycled material comes from a single layer tube consisting of a composition comprising only one PA11, in particular the composition of the layer (1) consists of 100% recycled material.

Advantageously, the composition of said layer (2) comprises a PA11, a PA12 or a PA612 and from 3 to 45% by weight of at least one impact modifier, in particular from 5 to 20% by weight of at least one impact modifier and the recycled material comes from a single layer tube consisting of a composition comprising only one PA11, in particular the composition of the layer (1) consists of 100% recycled material and the composition of the barrier layer comprises a compound selected from EVOH, whether impact modified or not, in particular impact modified, and a PPA selection from PA9T, MXD6, whether impact modified or not, and MXD10.

In a first variant of the multilayer tubular structure (MLT), it consists of three layers (2)//(1)//barrier.

In a second variant of the multilayer tubular structure (MLT), at least a second layer (2) is present, said layer (2) being the inner most layer in contact with the fluid. The MLT therefore consists of four layers (2)//(1)//barrier//(2) with, from the outside inwards: an outer layer (2), a layer (1), a barrier layer and an inner layer (2) in contact with the fluid for a motor vehicle.

The second inner layer (2) is defined as above but may be identical to or different from the outer layer (2).

In a third variant of the multilayer tubular structure (MLT), at least one binder layer (3) is present between the barrier layer and the second innermost layer (2) in contact with the fluid. MLT therefore consists of five layers (2)//(1)//barrier//binder (3)//(2).

In one embodiment, said layer (1) represents at least 10%, in particular at least 30%, notably at least 50% of the total thickness of said multilayer tubular structure (MLT).

Advantageously, said layer (1) represents at least 60%, in particular at least 70% of the total thickness of said multilayer tubular structure (MLT).

In one embodiment of one of the three variants of the multilayer tubular structure (MLT), said composition of said layer (1) is free of polyamides denoted A and B and said composition of said layer (2) comprises polyamides selected from those denoted E, F and a mixture thereof.

In another embodiment of one of the three variants of the multilayer tubular structure (MLT), said composition of said layer (1) comprises polyamides selected from those denoted A, B and a mixture thereof, and said composition of said layer (2) is free of polyamides denoted E and F.

In another further embodiment of one of the three variants of the multilayer tubular structure (MLT), said composition of said layer (1) comprises polyamides selected from those denoted A, B and a mixture thereof, and said composition of said layer (2) comprises polyamides selected from those denoted E, F and a mixture thereof.

In another further embodiment of one of the three variants of the multilayer tubular structure (MLT), said composition of said layer (1) is free of polyamides denoted A and B and said composition of said layer (2) is free of polyamides denoted E and F.

Advantageously, in these last four embodiments, the layer (1) comes from a single layer recycled tube.

Advantageously, in these last four embodiments, the layer (1) come from a single layer recycled tube and only said composition of said layer (1) comprises at least one impact modifier.

Advantageously, in these last four embodiments, the layer (1) comes from a single layer recycled tube and said composition of said layer (1) as well as said compositions of the layer or layers (2) comprise at least one impact modifier.

Advantageously, in these last four embodiments, the layer (1) comes from a multilayer recycled tube.

Advantageously, in these last four embodiments, the layer (1) come from a multilayer recycled tube and only said composition of said layer (1) comprises at least one impact modifier.

Advantageously, in these last four embodiments, the layer (1) comes from a multilayer layer recycled tube and said composition of said layer (1) as well as said compositions of the layer or the layers (2) comprise at least one impact modifier.

In one embodiment, the so-called multilayer tubular (MLT) is intended for transporting fluids selected from a fuel such as gasoline, in particular alcohol-based gasoline, bio-gasoline or diesel, in particular bio-diesel.

Regarding the Binder

The binder is notably described in patents EP1452307 and EP1162061, EP1216826, EP0428833 and EP3299165.

It is implicit that the layers (2) and (1) or (1) and (2') adhere to each other. The binder layer is intended to be inserted between two layers that do not adhere or adhere with difficulty to each other.

The binder may be, for example, but without being limited thereto, a composition based on 50% of copolyamide 6/12 (ratio of 70:30 by weight) with an Mn of 16000, and 50% of copolyamide 6/12 (ratio of 30:70 by weight) with an Mn of 16000, a composition based on PP (polypropylene) grafted with maleic anhydride, known under the name of Admer QF551A from Mitsui, a composition based on PA610 (with an Mn of 30000, and as otherwise defined) and 36% of PA6 (with an Mn of 28000) and 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba), a composition based on PA612 (with an Mn of 29000, and as otherwise defined) and 36% of PA6 (with an Mn of 28000, and as otherwise defined) and 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba), a composition based on PA610 (with an Mn of 30000, and as otherwise defined) and 36% of PA12 (with an Mn of 35000, and as otherwise defined) and of 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba), a composition based on 40% PA6 (with an Mn of 28000, and as otherwise defined), 40% of PA12 (with an Mn of 35000, and as otherwise defined) and 20% of functionalized EPR Exxelor VA1801 (from Exxon) and of 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba) or else a composition based on 40% PA6.10 (with an Mn of 30000, and as otherwise defined), 40% of PA6 (with an Mn of 28000, and as otherwise defined) and 20% of impact modifier, of the type ethylene/ethyl acrylate/anhydride in a weight ratio of 68.5:30:1.5 (MFI 6 at 190° C. under 2.16 kg), and of 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba).

EXAMPLES

The following resins were used in the various compositions of the invention:
PA11: Polyamide 11 of Mn (number-average molecular mass) 29000. The melting temperature is 190° C.; its melting enthalpy is 56 kJ/m2. The composition of this PA11 comprises 0.25% (+/−0.05%) of H3PO4.
PA12: Polyamide 12 of Mn (number-average molecular mass) 35000. The melting temperature is 178° C.; its melting enthalpy is 54 kJ/m2
PA12-B: Polyamide 12 of Mn (number-average molecular mass) 41000. The melting temperature is 178° C.; its melting enthalpy is 54 kJ/m2
PA1012: Polyamide 1012 of Mn (number-average molecular mass) 27000. The melting temperature is 190° C.; its melting enthalpy is 57 kJ/m2
PA612: Polyamide 612 of Mn (number-average molecular mass) 29000. The melting temperature is 218° C.; its melting enthalpy is 67 kJ/m2
PA610: Polyamide 610 of Mn (number-average molecular mass) 30000. The melting temperature is 223° C.; its melting enthalpy is 61 kJ/m2
PA6: Polyamide 6 of Mn (number-average molecular mass) 28000. The melting temperature is 220° C.; its melting enthalpy is 68 kJ/m2

The melting temperature and the melting enthalpy were determined according to standard ISO 11357-3:2013.

The following additives, plasticizers and impact modifiers were used in the compositions of the invention:
stabilizer: stabilizer consisting of 80% of phenol Lowinox 44B25 from Great Lakes, 20% of phosphite Irgafos 168 from Ciba
BBSA: BBSA (butyl benzene sulfonamide) plasticizer,
Imod=generically refers to a polyolefin type impact modifier or the like, such as among others PEBA (polyether block amide), core-shells, silicons . . . .
Imod1: refers to an EPR functionalized by a reactive group with anhydride function (at 0.5-1% by mass), of MFI 9 (at 230° C., below) 10 kg, of Exxellor VA1801 from Exxon.
Imod2: impact modifier of ethylene/ethyl acrylate/anhydride type with a mass ratio of 68.5:30:1.5 and MFI 6 at 190° C. under 2.16 kg.
Imod3: impact modifier of ethylene/butyl acrylate/anhydride type with a mass ratio of 79:18:3 and MFI 5 at 190° C. under 2.16 kg.

The Following Compositions were Used to Produce the Tubes According to the Invention:

In the entire description, all the percentages are given in weight.

In the case of compositions referred to as "recy", "recy2" and "recy3" used for the layer (1) of the tubes of the invention or counter-example tubes, protocols to simulate an aged tube were used:

Protocol A: The tube is (artificially) aged according to an easily reproducible model protocol that consists of placing it in air (in the presence of oxygen) at 150° C. for 96 hours (4 days), in order to thermo-oxidate it. This aging model is representative of the average thermo-oxidation undergone by the tubes in 10 years of service in a vehicle next to a warm engine.

This tube aged according to this protocol (PA11-recy) was crushed and the granules obtained were used for manufacturing the recycled layer (1) of example 9 and compared to a tube (example 10) whose recycled layer (1) comes from granules of a tube of PA11 PL (Pa11-recy-car) from a gasoline line of a Toyota vehicle, that is 10 years old and recrushed.

The results obtained on shock, aging, flexural modulus, adhesion and elongation show that protocol A is representative of a recrushed gasoline tube.

Specific protocols used during the (re)compounding of the aged tube.

After aging, the crushed tube can, in certain cases, be recompounded according to two protocols:

Protocol B: the crushed tube is recompounded on a Coperion/Werner 40 mm twin-screw extruder with a set-point of 70 kgh, 300 rpm, 270° C., with a degassing of −100 mmHg.

Protocol B2: the crushed tube is recompounded on a Coperion/Werner 40 mm twin-screw extruder with a set-point of 70 kgh, 300 rpm, 270° C., with a strong degassing of −660 mmHg.

The various compositions used for the preparation of the tubes of the invention are as follows:
PA11PL=PA11+7% BBSA+1% stabilizer
PA12PL=PA12+12% BBSA+1% stabilizer
PA11PL-recy=tube of PA11PL aged according to protocol A, recrushed, to then be recycled.

PA11PL-recy2=tube of PA11PL aged according to protocol A, recrushed, recompounded according to protocol B2, with, during this recompounding, addition of 7% of BBSA+0.5% of stabilizer, to then be recycled PA11PL-recy+50% PA12PL-recy=a 50:50 mixture of granules of PA11PL-recy and PA12PL-recy.

PA12PL-recy=tube of PA12PL aged according to protocol A, recrushed, to then be recycled.

PA12imod1=PA12+6% imod1+8% BBSA+1% stabilizer

PA1012PL4=PA1012+12% BBSA+1% stabilizer 1012-recy=tube of PA1012PL4 aged according to protocol A, recrushed, to then be recycled 11NX3=PA11+imod2 10%+PA610 5%+PA6 5%+BBSA 4%+stabilizer 1%

11NX3-recy2=tube of 11NX3 aged according to protocol A, recrushed, recompounded according to protocol B2, recompounding with strong degassing, with, during this recompounding, addition of 3% of BBSA and 0.5% of stabilizer.

PA11-recyNX3=tube of PA11PL aged according to protocol A, recrushed, recompounded according to protocol B2, with, during this recompounding, addition of imod2 10%+PA610 5%+PA6 5%+BBSA 4%+stabilizer 1%, to then be recycled PA12HIPHL=PA12+6% imod1+10% BBSA+1% stabilizer PA12HIP-recy3=tube of PA12HIPHL aged according to protocol A, recrushed, recompounded according to protocol B, with, during this recompounding, addition of 6% imod1, 9% BBSA and 1% of stabilizer; and being then intended to be recycled.

PA12HI2=PA12−B+10% imod1+5% of BBSA+1% of stabilizer

PA12HI2-recy2=tube of PA12HI2 aged according to protocol A, recrushed, recompounded according to protocol B, with, during this recompounding, addition of 5% of BBSA and 0.5% of stabilizer, to then be recycled.

MLT-cx11-recy=tube of MLT (11NX3//OHhi//11NX3 45//15//40%) aged according to protocol A, recrushed, recompounded according to protocol B, to then be recycled MLT-cx21-recy=tube of MLT (11NX3//MXD6hi 80/20%) aged according to protocol A, recrushed, recompounded according to protocol B, to then be recycled MLT-cx31-recy=tube of MLT (PA12H12//PA11-recyNX3//PPA9T 15/60/25%) aged according to protocol A, recrushed, recompounded according to protocol B, to then be recycled MLT-cx11-recy+20% MLTcx31-recy is a mixture of 80% of MLT-cx11-recy and 20% of MLT-cx31-recy.

OHhi=impact modified EVOH, marketed under the name of EVAL LA170B by Eval-Kuraray EVOH32=EVOH with 32% ethylene, marketed by Eval under the name of Eval FP101B PPA9T=coPPA9T of 50/50 (9T/9'T) impact modified type=grade Genestar N1001 DU83/02.

MXD6hi=composition of impact modified MXD6 (sold under the name Ixef BXT-2000 by Solvay. Its melting point is 237° C.

These compositions are manufactured by conventional compounding in a co-rotating twin screw extruder of Coperion 40 type, at 300 rpm, at 270° C. (or at 300° C. when the ingredients have a melting point higher than 260° C.).

Multi-Layer Tubes of the Invention:

The layers are described from the outside inwards, followed by their respective thicknesses indicated as a %; the dimension of the tubes is 8*1 mm Preparation of Multilayer Structures (Tubes):

The multi-layer tubes are manufactured by co-extrusion. An industrial Maillefer multilayer extrusion line is used, equipped with 5 extruders, connected to a multilayer extrusion head with spiral mandrels.

The screws used are extrusion monoscrews having screw profiles adapted to polyamides. In addition to the 5 extruders and the multilayer extrusion head, the extrusion line comprises:

a die-punch assembly, located at the end of the coextrusion head; the internal diameter of the die and the external diameter of the punch are selected according to the structure to be produced and the materials of which it is composed, as well as the dimensions of the tube and the line speed;

a vacuum tank with an adjustable vacuum level. In this tank water circulates generally maintained at 20° C., in which a gauge is submerged making it possible to shape the tube to its final dimensions. The diameter of the gauge is adapted to the dimensions of the tube to be produced, typically from 8.5 to 10 mm for a tube with an external diameter of 8 mm and a thickness of 1 mm;

a succession of cooling tanks in which water is maintained at around 20° C., allowing the tube to be cooled along the path from the head to the drawing bench;

a diameter meter;

a drawing bench.

The configuration with 5 extruders is used to produce tubes ranging from 2 layers to 5 layers (and also single layer tubes). In the case of structures whose number of layers is less than 5, several extruders are then fed with the same material.

Before the tests, in order to ensure the best properties for the tube and good extrusion quality, it is verified that the extruded materials have a residual moisture content before extrusion of less than 0.08%. Otherwise, an additional step of drying the material before the tests, generally in a vacuum dryer, is carried out overnight at 80° C.

The tubes, which satisfy the characteristics disclosed in the present patent application, were removed, after stabilization of the extrusion parameters, the dimensions of the tubes in question no longer changing over time. The diameter is controlled by a laser diameter meter installed at the end of the line.

The line speed is typically 20 m/min. It generally ranges from 5 to 100 m/min.

The screw speed of the extruders depends on the thickness of the layer and on the diameter of the screw as is known to those skilled in the art.

In general, the temperatures of the extruders and of the tools (head and connector) must be adjusted so as to be sufficiently higher than the melting temperature of the compositions in question, so that they remain in the molten state, thus preventing them from solidifying and jamming the machine.

The multi-layer tubes manufactured by extrusion above were then assessed according to a plurality of criteria:

Flex.: refers to the flexural modulus measured according to ISO178 at 23° C. on a tube conditioned with a humidity balance of 50% and at 23° C.

"+" is used for a flexibility that can be qualified as "good", which corresponds to <=1000 MPa and >500 MPa "++" is used for a flexibility that can be qualified as "very good", which corresponds to <=500 MPa and >250 MPa Shock: refers to the shock type VW–40° C. standard VW TL52435 2010 "++" is used for a shock performance that can be qualified as "very good", which corresponds to <=10% breakage.

"+" is used for a shock performance that can be qualified as "good", which corresponds to <=25% breakage and >10% breakage "–" is used for a shock performance that can be qualified as "quite poor", which corresponds to <=75% breakage and >25% breakage "--" is used for a shock performance that can be qualified as "very poor", which corresponds to >75%

Aging: this relates to durability, in other words, this refers to the resistance of the tube to oxidative aging in the warm air. The tube is aged in air at 150° C., then it is shocked with a shock according to standard DIN 73378, this shock being performed at –40° C. The half-life is indicated (in hours), which corresponds to the time after which 50% of the tubes tested break. A qualitative comment accompanies this value.

"++" is used for a durability that can be qualified as "very good", which corresponds to >=200 h of half-life.

"+" is used for a durability (thermo-oxidative aging resistance) that can be qualified as "good", which corresponds to >=100 h of half-life (and <200 h)

"+–", is used for durability (thermo-oxidative aging resistance) that can be qualified as "acceptable", which corresponds to >=50 h of half-life (and <100 h)

"–" is used for durability (thermo-oxidative aging resistance) that can be qualified as "poor", which corresponds to <50 h In cases where a half-life number is given to show very slight differences, this number is rounded to the nearest 25-hour increment, to take into account significant figures, related to the accuracy of the evaluation.

Adh.: this is the adhesive strength. It reflects the peel strength, expressed in N/cm, and measured on the tube with a diameter of 8 mm and thickness of 1 mm having undergone conditioning for >=15 days at 50% relative humidity at 23° C., such that the humidity balance is achieved in the sample.

The value given relates to the weakest interface, that is to say the least adherent of the multilayer, where there is therefore the greatest risk of detachment. The peeling is performed at the interface by pulling one of the parts at an angle of 90° and at a speed of 50 mm/min according to the following method.

A sample strip of a 9 mm wide tube is cut. This strip is therefore in the shape of a tile and still has all the layers of the original tube. The two layers of the interface to be assessed begin to be separated using a knife. Each of the thus separated layers are placed in the jaws of a universal testing machine. The peeling is carried out by pulling these 2 layers on either side at 180 degrees and at a speed of 50 mm/min. The strip, and therefore the interface, is maintained at 90 degrees relative to the direction of pulling.

The following is noted:
+++: very good, >50
++: good, >20 and <=50
+: quite good (acceptable), >10 and <=20
–; poor, <=10

El. %: this is the elongation at the rupture point performed according to standard ISO R527 except that it is measured on a tube with a diameter of 8 mm and thickness of 1 mm. The sample is ISO-conditioned, i.e. a conditioning of >=15 days at 50% relative humidity at 23° C. such that the humidity balance is achieved in the sample.

The following is noted:
+++: very good, >=200% elongation
++: good, >=100 and <200% elongation
+: unsatisfactory: <100% elongation The results are given in Table 1.

TABLE 1

| Example | Structure and thickness of layers (as a % of total thickness) | Shock | Aging | Flex. | Adh. | El.% |
|---|---|---|---|---|---|---|
| Ex1 | PA12imod1 // PA11-recyNX3 // OHhi // 11NX3 15/30/15/40% | ++ | ++ | NT | ++ | +++ |
| Ex2 | 11NX3 // PA11-recyNX3 // OHhi // 11NX3 15/30/15/40% | ++ | ++ | NT | ++ | +++ |
| Ex3 | 11NX3 //MLT-cx11-recy// OHhi // 11NX3 15/30/15/40% | ++ | ++ | NT | ++ | +++ |
| Ex4 | PA12imod1 //MLT-cx11-recy// OHhi // 11NX3 15/30/15/40% | ++ | ++ | NT | ++ | +++ |
| Ex5 | PA12imod1 //MLT-cx11-recy// OHhi // MLT-cx11-recy // PA12imod1 30/15/15/15/25% | ++ | ++ | NT | ++ | +++ |
| Ex6 | 11NX3 //MLT-cx11-recy + 20% MLTcx31-recy// OHhi // 11NX3 15/30/15/40% | + | + | NT | ++ | +++ |
| Ex7 | PA12imod1 //MLT-cx21-recy// MXD6hi // 11NX3 15 // 30 // 15 // 40% | + | + | NT | ++ | +++ |
| Ex8 | PA12imod1 //MLT-cx21-recy// MXD6hi 25 // 55 // 20% | + | + | NT | ++ | +++ |
| Ex9 | PA12H12 //PA11-recyNX3//PPA9T 15/60/25% | + | ++ 275 h | NT | ++ | +++ |
| Ex10 | PA12H12 //MLT-cx31-recy// PPA9T 60/20/20% | + | ++ 225 h | NT | ++ | +++ |
| Ex11 | 11NX3 //MLT-cx31-recy// PPA9T 60/20/20% | + | ++ 300 h | NT | ++ | +++ |
| Ex12 | PA11PL // PA12H12-recy2//PPA9T 15/60/25% | + | + 125 h | NT | + | +++ |

TABLE 1-continued

| | Structure and thickness of layers (as a % of total thickness) | Shock | Aging | Flex. | Adh. | El.% |
|---|---|---|---|---|---|---|
| Ex13 | PA11PL // PA11-recy2//PPA9T 15/60/25% | + | + 125 h | NT | ++ | +++ |
| Ex14 | 11NX3 // PA11-recyNX3//PPA9T 15/60/25% | + | ++ 325 h | NT | ++ | +++ |
| counter examples | | | | | | |
| cx1 | PA12PL // PA12HIPHL-recy // PA12PL 15/70/15% | − | − | + | +++ | +++ |
| cx2 | PA12PL // PA12PL-recy // PA12PL 15/70/15% | −− | − | + | +++ | +++ |
| cx3 | PA12PL // PA11PL-recy // PA12PL 15/70/15% | − | − | + | +++ | +++ |
| cx4 | Single layer PA12PL-recy | −− | − | + | NT | + |
| cx5 | single layer PA11PL-recy | + | − | ++ | NT | + |
| cx6 | Single layer PA11PL-recy2 | ++ | − | ++ | NT | ++ |
| cx7 | Single layer PA12HIP-recy3 | + | − | ++ | NT | ++ |
| cx8 | Single layer 1012-recy | − | − | + | NT | + |
| cx9 | 11NX3 // MXD6hi 80/20% | + | + | NT | ++ | +++ |
| cx10 | PA12H12 // PPA9T 75/25% | + | ++ 275 h | NT | + | +++ |

NT: Not tested

The invention claimed is:

1. A multilayer tubular structure for transporting fluids for a motor vehicle, the structure comprising at least three layers:
   at least one layer (1) consisting of a composition comprising at least 50% by weight of at least one semi-crystalline aliphatic polyamide, said composition consisting of at least 50% of recycled material from a single layer and/or multilayer tube that initially transported fluids for a motor vehicle, wherein a sum of constituents of the composition is equal to 100%, said tube consisting of a composition that comprises at least 50% by weight of at least one polyamide,
   at least one layer (2) consisting of a composition comprising at least 50% by weight of at least one semi-crystalline aliphatic polyamide and optionally at least one impact modifier,
   and when the layer (2) consists of a composition comprising at least 50% by weight of at least one semi-crystalline aliphatic polyamide that is PA12 and/or PA612 and/or PA1010, then said composition comprises said impact modifier, and
   at least one barrier layer,
   said layer (2) and the barrier layer each consisting of at least 90% of non-recycled material.

2. The multilayer tubular structure according to claim 1, wherein said layer (1) is located between a layer (2) and a barrier layer.

3. The multilayer tubular structure according to claim 1, wherein the barrier layer is the layer in contact with the fluid.

4. The multilayer tubular structure according to claim 1, wherein said layer (1) represents at least 10% of the total thickness of said multilayer tubular structure.

5. The multilayer tubular structure according to claim 1, wherein said layer (1) consists of a composition comprising:
   at least 50% by weight of at least one semi-crystalline aliphatic polyamide denoted C having an average number of carbon atoms per nitrogen atom denoted CC comprised from 6 to 18;
   from 0 to 25% by weight of at least one semi-crystalline aliphatic polyamide denoted B and having an average number of carbon atoms per nitrogen atom denoted $CB = C_c - 1$;
   from 0 to 25% by weight of a semi-crystalline aliphatic polyamide denoted A having an average number of carbon atoms per nitrogen atom denoted $CA = CB - 1$;
   from 0 to 45% by weight of at least one impact modifier,
   from 0 to 20% by weight of at least one plasticizer,
   from 0 to 2% by weight of at least one additive,
   the sum of the constituents being equal to 100%.

6. The multilayer tubular structure according to claim 1, wherein the fluid transported by said single layer and/or multilayer tube is the same as that of said multilayer tubular structure.

7. The multilayer tubular structure according to claim 1, wherein the fluid transported by said single layer and/or multilayer tube is different to that of said multilayer tubular structure.

8. The multilayer tubular structure according to claim 1, wherein the Tf of the predominant semi-crystalline aliphatic polyamide of the layer is ≤225° C., as determined by DSC according to standard ISO 11357-3:2013, at a heating rate of 20 K/min.

9. The multilayer tubular structure according to claim 1, wherein the predominant semi-crystalline aliphatic polyamide of the layer (1) has a crystallization enthalpy>25 J/g, as determined by DSC according to standard ISO 11357-3:2013 at a heating rate of 20 K/min.

10. The multilayer tubular structure according to claim 1, wherein the multilayer tubular structure consists of three layers with the following structure: (2)//(1)//barrier.

11. The multilayer tubular structure according to claim 1, further comprising a second layer of the at least one layer (2), said second layer of the at least one layer (2) being an innermost layer in contact with the fluid.

12. The multilayer tubular structure according to claim 11, wherein at least one binder layer (3) is present between the barrier layer and the second innermost layer (2) in contact with the fluid,
   wherein the multilayer tubular structure comprises, from outside to inside, layer (2), layer (1), barrier layer, binder layer (3), and innermost layer (2).

13. The multilayer tubular structure according to claim 1, wherein the recycled material comes from a single layer and/or multilayer tube selected from a crushed single layer and/or multilayer tube, a crushed and recompounded single layer and/or multilayer tube, and a crushed, recompounded and reformulated single layer and/or multilayer tube.

14. The multilayer tubular structure according to claim 13, wherein said composition of the layer (1) is free of plasticizer and/or impact modifier and said recycled material comes from a single layer and/or multilayer tube selected from a crushed single layer and/or multilayer tube, a crushed and recompounded single layer and/or multilayer tube, and a crushed, recompounded and reformulated single layer and/or multilayer tube.

15. The multilayer tubular structure according to claim 13, wherein said composition of the layer (1) comprises at least one compound selected from a plasticizer, an impact modifier and an additive, and said recycled material comes from a single layer and/or multilayer tube selected from a crushed, then recompounded and reformulated single layer and/or multilayer tube.

16. The multilayer tubular structure according to claim 1, wherein the layer (2) consists of a composition comprising:
    at least 50% by weight of at least one semi-crystalline aliphatic polyamide denoted D having an average number of carbon atoms per nitrogen atom denoted CD comprised from 6 to 18;
    from 0 to 50% by weight of at least one semi-crystalline aliphatic polyamide denoted E and having an average number of carbon atoms per nitrogen atom denoted $CE=CD-1$;
    from 0 to 50% by weight of a semi-crystalline aliphatic polyamide denoted F having an average number of carbon atoms per nitrogen atom denoted $CF=CE-1$;
    from 3 to 45% by weight of at least one impact modifier,
    from 0 to 20% by weight of at least one plasticizer,
    from 0 to 2% by weight of at least one additive,
    from 0 to 35% of at least one antistatic filler,
    the sum of the constituents being equal to 100%.

17. The multilayer tubular structure according to claim 16,
    wherein said layer (1) consists of a composition comprising:
    at least 50% by weight of at least one semi-crystalline aliphatic polyamide denoted C having an average number of carbon atoms per nitrogen atom denoted CC comprised from 6 to 18;
    from 0 to 25% by weight of at least one semi-crystalline aliphatic polyamide denoted B and having an average number of carbon atoms per nitrogen atom denoted $CB=Cc-1$;
    from 0 to 25% by weight of a semi-crystalline aliphatic polyamide denoted A having an average number of carbon atoms per nitrogen atom denoted $CA=CB-1$;
    from 0 to 45% by weight of at least one impact modifier,
    from 0 to 20% by weight of at least one plasticizer,
    from 0 to 2% by weight of at least one additive,
    the sum of the constituents being equal to 100%,
    wherein said composition of said layer (1) is free of polyamides denoted A and B and said composition of said layer (2) comprises polyamides selected from those denoted E, F, and a mixture thereof.

18. The multilayer tubular structure according to claim 16,
    wherein said layer (1) consists of a composition comprising:
    at least 50% by weight of at least one semi-crystalline aliphatic polyamide denoted C having an average number of carbon atoms per nitrogen atom denoted CC comprised from 6 to 18;
    from 0 to 25% by weight of at least one semi-crystalline aliphatic polyamide denoted B and having an average number of carbon atoms per nitrogen atom denoted $CB=Cc-1$;
    from 0 to 25% by weight of a semi-crystalline aliphatic polyamide denoted A having an average number of carbon atoms per nitrogen atom denoted $CA=CB-1$;
    from 0 to 45% by weight of at least one impact modifier,
    from 0 to 20% by weight of at least one plasticizer,
    from 0 to 2% by weight of at least one additive,
    the sum of the constituents being equal to 100%,
    wherein said composition of said layer (1) comprises polyamides selected from those denoted A, B, and a mixture thereof, and said composition of said layer (2) is free of polyamides denoted E and F.

19. The multilayer tubular structure according to claim 16, wherein the layer (1) comes from a single layer recycled tube.

20. The multilayer tubular structure according to claim 16, wherein the layer comes from a multilayer recycled tube.

* * * * *